June 3, 1969  R. C. BUELER  3,448,230
CONTROL VALVE AND SYSTEM
Filed March 28, 1967  Sheet 1 of 2

INVENTOR
RICHARD C. BUELER
BY
*Joseph E. Papin.*

United States Patent Office 3,448,230
Patented June 3, 1969

3,448,230
CONTROL VALVE AND SYSTEM
Richard C. Bueler, Glendale, Mo., assignor, by mesne assignments, to Wagner Electric Corporation, South Bend, Ind., a corporation of Delaware
Filed Mar. 28, 1967, Ser. No. 626,515
Int. Cl. H01h 35/38
U.S. Cl. 200—82
23 Claims

ABSTRACT OF THE DISCLOSURE

A system having a dual master cylinder for normally transmitting actuating fluid pressure directly to front vehicle brakes and also transmitting another actuating fluid pressure through a proportioning valve to predeterminately reduce the magnitude thereof to rear vehicle brakes, and a control valve responsive to failure of said first named actuating fluid pressure to by-pass said other actuating fluid pressure directly to said rear vehicle brakes and obviate the predetermined reduction in the magnitude thereof.

---

Figure 1:
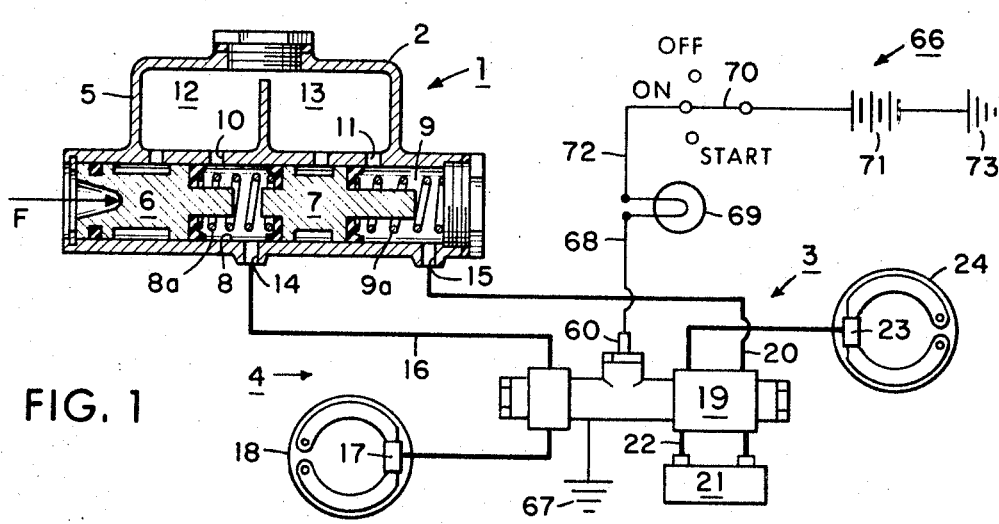

This invention relates in general to fluid pressure systems and control valves therefor and in particular to those controlling pressure fluid flow between front and rear vehicle brakes.

In the past vehicle brake systems, a dual master cylinder created substantially equal first and second fluid pressures which respectively flowed through a warning valve operative in the event of a predetermined differential between the magnitudes of said first and second fluid pressures to energize a driver warning light through an electrical circuit connected therewith. The first fluid pressure was transmitted directly from the warning valve to actuate front vehicle brakes, and the second fluid pressure was transmitted from said warning valve through a proportioning valve to actuate rear vehicle brakes, said proportioning valve serving to predeterminately reduce the magnitude of the fluid pressure applied to said rear vehicle brakes to obviate brake locking or vehicle skidding or the like. Of course, the obvious disadvantageous or undesirable feature of such past braking systems was that the proportioning valve was effective to continue to reduce the magnitude of the fluid pressure applied to actuate the rear vehicle brakes when the first fluid pressure for actuating the front vehicle brakes failed.

The principal object of the present invention is to provide a novel fluid pressure system and a novel control valve for use therein which obviates the aforementioned disadvantageous or undesirable feature, as well as others, and this and other objects and advantageous features of the present invention will become apparent hereinafter.

Briefly, one aspect of the present invention includes a fluid pressure system having dual fluid pressure generating means therein for respectively actuating a pair of fluid pressure responsive friction devices, means for effecting a ratio between the respective applied fluid pressures and other means for by-passing said last named means upon failure of one of the applied fluid pressures. Another aspect of the present invention includes a control valve having movable means defining therein a pair of pressure fluid flow passages and also by-passing passage means for connection with one of said flow passages upon the establishment of a predetermined fluid pressure differential between the respective fluid pressures in said flow passages.

Figure 2:
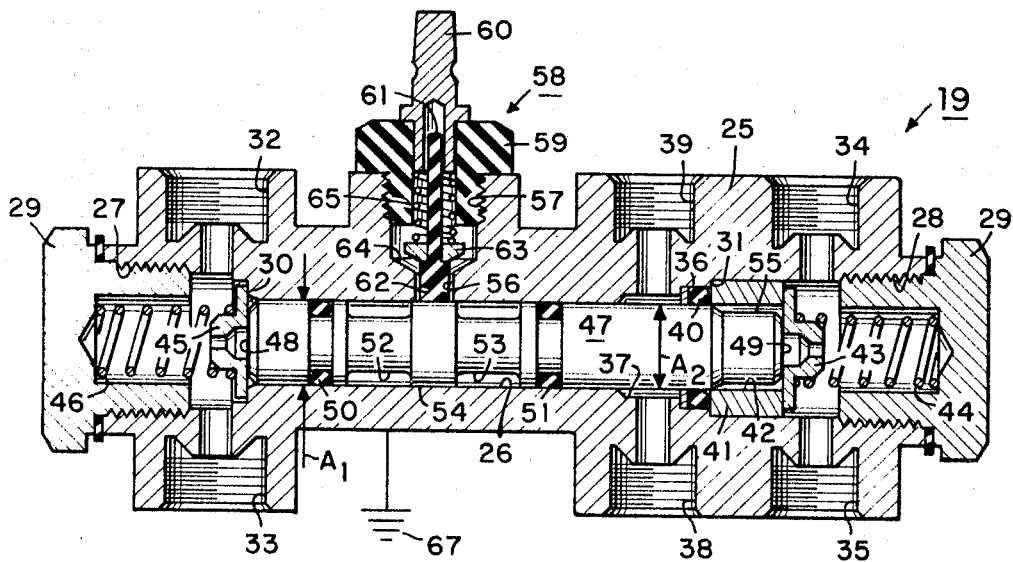
Figure 3:
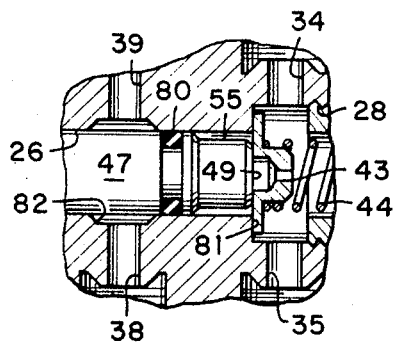
Figure 4:
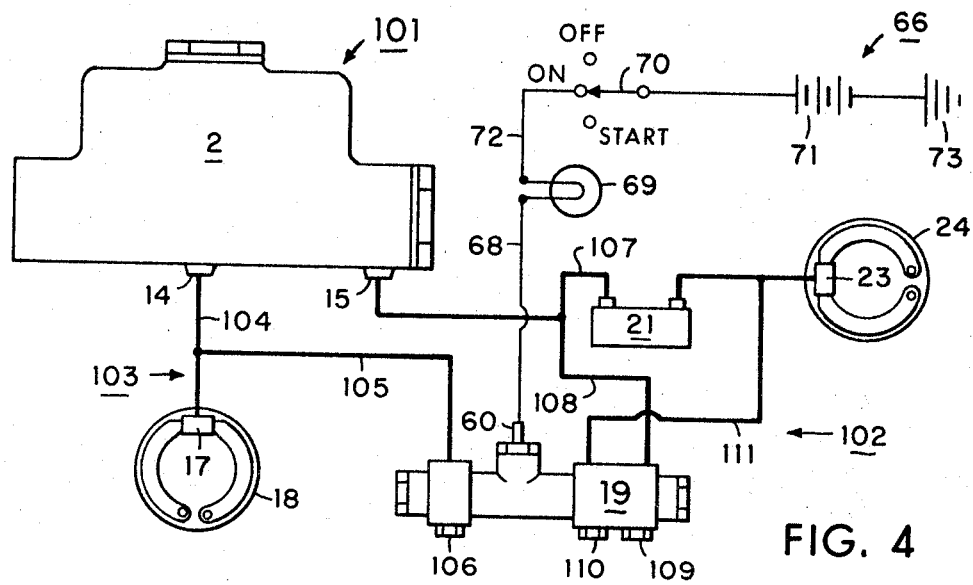
Figure 5:
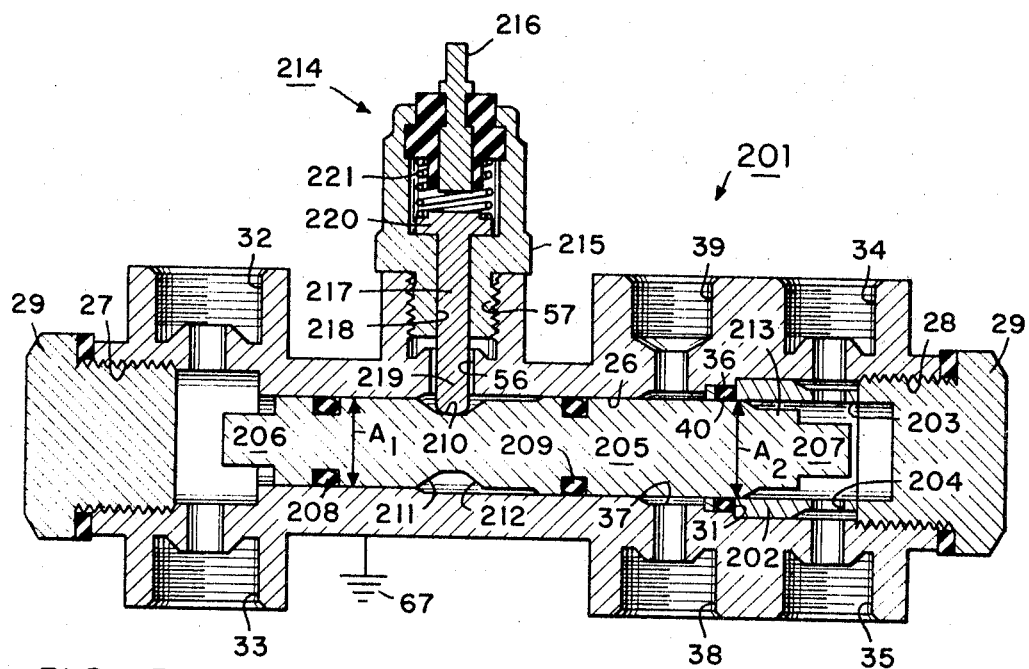

In the drawings which illustrate embodiments of the invention,

FIGS. 1 and 4 are schematic diagrams of brake systems embodying the present invention, FIGS. 2 and 5 are sectional views showing control valves also embodied in the present invention and for use in the systems of FIGS. 1 and 4 in cross-section, and FIG. 3 is a fragmentary view taken from FIG. 2 showing an alternative construction of the control valve therein also embodied in the present invention.

Referring now to FIG. 1, a vehicle fluid pressure or brake system, shown generally at 1, is provided with pressure generating means, such as a dual or tandem master cylinder 2, well known in the art, connected in rear and front brake branches, indicated generally at 3 and 4. The master cylinder 2 is provided with a housing 5 having primary and secondary fluid pressure generating pistons 6, 7 movable therein, said pistons defining a primary pressure generating chamber 8 therebetween and said secondary piston defining with said housing a secondary pressure generating chamber 9. Force transmitting or return springs 8a, 9a are biased between the pistons 6, 7 and between the piston 7 and the end wall of the housing 5 in the chambers 8, 9, respectively. The primary and secondary chambers 8, 9 are respectively connected by compensating ports 10, 11 with divided reservoir chambers 12, 13 in the master cylinder housing 5 and with system branches 4, 3 by outlet ports 14, 15 also in said master cylinder housing. The branch 4 also includes a conduit 16 having one end connected with the outlet port 14 and the other end thereof connecting with a servo motor or wheel cylinder 17 of a vehicle front brake 18, and one of a pair of sets of flow ports of a control or driver warning valve, indicated generally at 19, is serially interposed in the conduit 16. In the branch 3, the other of the pair of sets of flow ports in the control valve 19 is serially interposed in another conduit 20 which has one end connected with the master cylinder outlet port 15 and the other end thereof connected with the input side or port of a proportioning valve or ratio changer 21 of a type generally well known in the art, such as that disclosed in United States Patent No. 3,232,057 issued to Raymond J. Kersting on Feb. 1, 1966, for instance. The control valve 19 is also provided with a set of delivery ports which are serially interposed in another conduit 22 having one end connected with the output side or port of the proportioning valve 21 and the other end thereof connected with a servo motor or wheel cylinder 23 of a vehicle front brake 24. To complete the description of the system 1, the proportioning valve 21 is operative in response to fluid pressure applied to the input side thereof in excess of a predetermined value to provide an altered output fluid pressure at the output side thereof in a predetermined constant ratio or a predetermined variable ratio, as desired, with the applied fluid pressure at the input side thereof, and generally, the magnitude of the output fluid pressure will be less than that of the applied fluid pressure at the input side of said proportioning valve.

The control valve 19 is provided with a housing 25 having a bore 26 therein interposed between aligned counterbores or chambers 27, 28, said counterbores being closed at their outer ends by plugs or closure members 29 threadedly received therein, and annular shoulders 30, 31 are defined on said housing at the juncture of said bore with said counterbores, respectively. One set of flow ports 32, 33 which receive the conduit 16, as previously mentioned, are oppositely provided in the control valve housing 25 intersecting with the counterbore 27, and the other set of flow ports 34, 35 which receive the conduit 20, as previously mentioned, are oppositely provided in said control valve housing intersecting with the counterbore 28. A pair of annular stepped recesses 36, 37 are provided in one end of the housing bore 26 connecting with the housing shoulder 31, and delivery ports 38, 39 which receive the conduit 22, as previously mentioned, are also provided in the control valve housing 25 intersecting with the recess 37, said recess 37 defining another chamber in said housing for by-pass connection with the counterbore 28, as described hereinafter.

An O-ring seal 40 is disposed in the housing recess 36, and an annular spacer member 41 having an axial bore 42 therethrough is provided in the housing counterbore 28 and is normally urged into engagement with the housing shoulder 31 by a spring retainer 43 and spring 44 to prevent displacement of the seal 40 from the recess 36. Another spring retainer 45 in the housing counterbore 27 is biased into engagement with the housing shoulder 30 by another spring 46, said springs 44, 46 having substantially equal and opposed compressive forces. A shiftable piston or switch actuating member 47 is slidably received in the housing bore 26 having opposed ends 48, 49 for abutting engagement with the spring retainers 43, 45, respectively, said opposed ends having substantially equal effective areas $A_1$, $A_2$ for subjection to fluid pressure in the housing counterbores 27, 28, respectively. The piston 47 is provided with a peripheral seal 50 for sealing engagement with the housing bore 26 adjacent to the leftward end thereof, and another peripheral seal 51 is carried in said piston for sealing engagement with said housing bore adjacent to the recess 37. Spaced peripheral grooves 52, 53 are provided in the piston 47 between the seals 50, 51 and a land or annular abutment surface 54 is defined between said peripheral grooves in sliding engagement with the housing bore 26. The piston 47 extends coaxially through the recesses 36, 37 in sealing engagement with the seal 40 and is provided with a reduced peripheral portion 55 at the rightward end 49 thereof which defines with the spacer member bore 42 and the housing recess 37 a by-pass passage upon actuation of said piston in the leftward direction, as will be discussed in detail hereinafter.

The control valve housing 25 is also provided with a cross-bore and counterbore 56, 57 intersecting the housing bore 26 adjacent to the mid-portion thereof and substantially aligned with the piston land 54. An electrical switch, indicated generally at 58, includes a closure or plug member 59 of suitable insulating material which is threadedly received in the housing counterbore 57, and a metal terminal 60 extends through said plug member. A switch operating member 61 of suitable insulating material has a lower end or follower portion 62 slidably and guidably movable in the housing bore 57, and an electrical contact member 63 is carried on said switch operating member for electrical contact or engagement with a cooperating shoulder or contact 64 defined on the housing 25 at the juncture of the housing bore and counterbore 56, 57. A spring 65 having a current carrying capacity is biased in electrical contact engagement between the switch terminal 60 and the switch contact 63 urging the switch operating member lower end 62 into abutting or positioning engagement with the piston land 54 and urging said contact toward engagement with the housing shoulder 64, said contact being normally spaced from said shoulder when said switch operating member lower end is engaged with said piston land.

Referring now to FIGS. 1 and 2, an electrical driver warning circuit, indicated generally at 66, is provided to warn the vehicle operator of a failure in the system 1, the control valve housing 25 included in said circuit being grounded by suitable means at 67 wherein the housing shoulder 64 becomes an electrical contact, as mentioned hereinbefore. The external end of the housing terminal 60 is electrically connected by a lead 68 to one side of an electrical driver signal means, shown as a lamp 69, and the other side of said lamp is connected through a vehicle ignition switch, indicated diagrammatically at 70, with a battery 1 by a lead 2, said battery being grounded by suitable means at 73.

In the operation with the component parts of the system 1 and control valve 19 positioned as described above, an operator applied force on the primary piston 6 of the master cylinder 2 concertedly urges the pistons 6, 7 rightwardly to initially close the compensating ports 10, 11 isolating the chambers 8, 9 from the reservoirs 12, 13, respectively, and thereafter generate or establish substantially equal fluid pressures in said chambers, respectively. The fluid pressure established in the chamber 8 is transmitted in the branch 4 through the master cylinder outlet port 14, the conduit 16, the flow ports 32, 33 and counterbore 27 of the control valve 19 into the wheel cylinder 17 to effect energization or actuation of the front brake 18. In the branch 3, the fluid pressure generated in the chamber 9 is transmitted through the master cylinder outlet port 15, the conduit 20, the flow ports 34, 35 and counterbore 28 of the control valve 19 to the input side of the proportioning valve 21. As previously mentioned, the proportioning valve is operative in response to the generated or established fluid pressure applied to the input side thereof in excess of a predetermined value to provide an output fluid pressure at the output side thereof in ratio with that applied at the input side and having a magnitude proportionally less than that applied at the input side; therefore, the altered or reduced output fluid pressure is delivered or transmitted from the output side of the proportioning valve through the conduit 22, the delivery ports 38, 39 and recess 37 of the control valve 19 into the wheel cylinder 23 to effect energization or actuation of the rear brake 24. It is, of course, obvious that the intensity of the rear brake energization will be proportionally less than that of the front brake due to the "proportioning" or "ratioing" effect of the proportioning valve 21. In other words, the reduced output fluid pressure from the proportioning valve is less than but proportional to the established fluid pressure applied thereto which is, for practical purposes, substantially equal to the established fluid pressure in the branch 3; therefore, the reduced output fluid pressure effecting energization of the rear brake 24 is also proportional to or in ratio with the established fluid pressure in the branch 4 effecting energization of the front brake 18. It is also obvious that, due to tolerance build-ups of the component parts of the system 1, inherent resistances in said system, or the like, one of the established fluid pressures in the flow chambers 27, 28 of the control valve 19 might fluctuate, spike, or be momentarily slightly greater than the other of the established fluid pressures at the beginning of a braking application. In this manner, a relatively small differential force created by the momentary and rather small pressure differential between the fluid pressures in the flow chambers 27, 28 acting on the opposed substantially equal effective areas $A_1$, $A_2$ of the piston 47 is established; however, it is contemplated that the compressive forces of the springs 44, 46 are predetermined at a value great enough to obviate or substantially prevent shifting movement of the piston 47 in response to such momentary differential forces.

In the event that the established fluid pressure in the branch 4 fails, due to leaks or the like in said branch or for instance a rupture in the conduit 16, the established fluid pressure in the control valve chamber 28 acting on the effective area $A_2$ of the piston 47 creates a sustained force to move said piston leftwardly against the compressive force of the spring 46. This leftward movement of the piston 47 in response to the sustained force disengages the peripheral surface of said piston from the seal 40 and moves at least a portion of the reduced peripheral end portion or by-pass passage 55 of said piston through the seal 40 to connect the chamber 28 in by-pass relation with the housing recess 37 through the by-pass passage defined by the reduced end portion 55 when said piston is in its leftward actuated position. In this manner, the established fluid pressure in the branch 3 is now transmitted from the master cylinder chamber 9 through the outlet port 15 and the conduit 20 to the flow port 34 of the control valve 19 and therefrom through the chamber 28, the spacer member bore 42 and piston by-pass passage 55, the housing recess 37 and delivery port 39 into the wheel cylinder 23 to effect energization of the rear brakes 24. Therefore, upon the failure of fluid pressure in the branch 4, it is obvious that the established fluid pressure in the branch 3 is transmitted directly to the wheel cylinder 23 effecting full energization of the rear brakes 24, and also that the proportioning valve is by-passed or shunted to obviate the altering effect thereof on the magnitude of the established fluid pressure normally delivered to the rear brakes 24.

The leftward movement of the piston 47 upon the failure of fluid pressure in the branch 4, as described above, moves the piston land 54 leftwardly toward a position disengaged from the lower end 62 of the switch operating member 61, and the compressive force of the switch spring 65 moves said switch operating member downwardly to engage the contact 63 thereof with the housing shoulder 64 and position the switch operating member lower end 62 within the peripheral groove 53 of the piston member 47. In this manner, the engagement of the switch operating member contact 63 with the housing shoulder 64 completes the electrical circuit 66 to light the driver warning lamp 69 by effecting current flow from the battery 71 through the ignition switch 70, the lead 72, said lamp, the lead 68, the terminal 60, the spring 65, the contact 63 and housing shoulder 64 to the ground at 67. With the driver warning light 69 so lighted to warn the driver of a malfunction in the braking system 1, the abutment between the switch operating member lower end 62 and the side wall of the groove 53 defining the land 54 prevents the return of the piston 47 to its centered or normal position by the compressive force of the spring 46 when the established fluid pressure in the branch 3 is eliminated at the end of a braking application by the removal of the operator applied force.

It is, of course, obvious that the control valve 19 functions in substantially the same manner to actuate the electrical circuit 66 in the event that the established fluid pressure in the branch 3 fails wherein the established fluid pressure in the branch 4 acts on the effective area $A_1$ of the piston 47 to effect rightward movement thereof against the spring 44 and actuate the electrical switch 58, as previously described hereinabove.

Referring now to FIG. 3, an alternate construction for the control valve 19 wherein the piston 47 is provided with a peripheral seal 80 adjacent to the reduced end portion 55 thereof for sealing engagement with the housing bore 26 between an annular shoulder 81 defined at the juncture of said housing bore and said counterbore 28 and an undercut or recess 82 provided in said housing bore and interconnecting the delivery ports 38, 39. The spring 44 urges the retainer 43 into abutment with the housing shoulder 81. In the event of fluid pressure failure in the branch 4 establishing the sustained force for moving the piston 47 leftwardly against the compressive force of the spring 46, as previously described hereinbefore, the seal 80 is moved leftwardly with the piston toward a position within the recess 82 and disengaged from the housing bore 26 to open the by-pass passage 55 in said piston between the flow chamber 28 and recess 37 and establish pressure fluid flow from the flow port 34 through said flow chamber, said by-pass passage means, said recess and the delivery port 39 to effect full energization of the rear brake 24 while by-passing the proportioning valve 21.

Referring now to FIG. 4, another vehicle fluid pressure or brake system, indicated generally at 101, is provided with substantially the same component parts and functions in substantially the same manner as the system 1 with the following exceptions.

The system 101 is provided with rear and front brake branches, indicated generally at 102, 103. The branch 103 is provided with a conduit 104 connected between the outlet port 14 of the master cylinder 2 and the wheel cylinder 17 of the front brake 18, and another conduit 105 is interposed between the conduit 104 and the flow port 32 of the control valve 19, the control valve port 33 being closed by suitable means, such as a plug or closure member 106. The branch 102 is provided with a conduit 107 connected between the outlet port 15 of the master cylinder 2 and the wheel cylinder 23 of the rear brake 24, and the proportioning valve 21 is serially interposed in said conduit 107. Another conduit 108 has one end intersecting with the conduit 107 between the master cylinder outlet port 15 and the proportioning valve 21 and the other end thereof connecting with the flow port 34 of the control valve 19, the control valve ports 35, 38 being closed by suitable means, such as plugs or closure members 109, 110. To complete the description of the system 101, a by-pass conduit 111 has one end intersecting the conduit 107 between the proportioning valve 21 and the wheel cylinder 23 of the rear brake 24 and the other end thereof connecting with the by-pass port 39 of the control valve 19. When the piston 47 of the control valve 19 is actuated in the leftward direction to open the by-pass passage, as described hereinbefore, in response to failure of the established fluid pressure in the branch 103, the established fluid pressure in the branch 102 is delivered to the brake 24 to effect full energization thereof through the conduit 108, the control valve port 34, the counterbore 28, the open by-pass passage into the housing bore recess 37 and therefrom through the by-pass port 39 and conduit 111; therefore, it is obvious that the established fluid pressure is by-passed or shunted around the proportioning valve 21 to obviate its altering effect on the magnitude of the established fluid pressure normally delivered therethrough to said brake.

In FIG. 5, another control valve 201 is shown having substantially the same component parts and functioning in the systems 1 and 101 substantially in the same manner as the previously described control valve 19 with the following exceptions.

The control valve 201 is provided with an annular spacer member 202 in the housing counterbore 28 between the plug 29 and housing shoulder 31 to retain the seal 40 against displacement, and an axial bore 203 is provided through said spacer member substantially coaxial with the housing bore 26, said spacer member bore being intersected by a plurality of cross-passages 204 to communicate said spacer member bore with the ports 34, 35, A shiftable piston or switch actuating member 205 is slidably received in the housing bore 26 having opposed end portions 206, 207 defining effective areas $A_1$, $A_2$ and subjected to fluid pressure in the housing counterbores 27, 28, respectively. Peripheral seals 208, 209 are carried in the piston 205 for sealing engagement with the housing bore 26 adjacent to the leftward end thereof and adjacent to the recess 37 therein, and a peripheral groove 210 is provided in said piston having opposed side walls 211, 212 inclined at predetermined angles with the axis of said piston. The piston 205 extends coaxially through the housing recesses 36, 37 in sealing engagement with the seal 40 and is provided with a reduced peripheral portion 213 at the rightward end portion 207 thereof which defines with the spacer member bore 203 and the housing recess 37 a by-pass passage upon actuation of said piston in the leftward direction.

The control valve 201 is also provided with an electrical switch, indicated generally at 214, which includes a conductive closure or plug member 215 threadedly received in the housing counterbore 57, and a metal terminal 216 extends through said plug member and is insulated therefrom, said terminal having the exterior end thereof connected with the lead 68 of the circuit 66. A conductive switch member 217 is slidably received in a bore 218 provided in the switch closure member 215, said switch member having a lower end portion 219 extending through the housing cross-bore 56 into following engagement with the peripheral groove 210 of the piston 205 in the housing bore 26 and having an upper end portion 220 defining a contact for electrical contact or engagement with the interior end of the terminal 216. A spring 221 of predetermined compressive force urges the contact 220 away from the terminal 216 and urges the switch member follower end 219 into positioning engagement with the piston peripheral groove 210. The compressive force of the spring 221 is predetermined at a value great enough to substantially prevent shifting movement of the piston 205 in conjunction with the force also opposing shifting movement of said piston of the switch member lower end 219 being moved up the inclined peripheral groove surfaces 211 or 212.

In the event that the established fluid pressure in the branch 103 fails, due to leaks or the like in said branch or, for instance, a rupture in the conduits 104 or 105, the established fluid pressure in the control valve chamber 28 acting on the effective area $A_2$ of the piston 205 creates a sustained force to move said piston leftwardly against the compressive force of the switch spring 221 urging the switch member 217 into following engagement with the peripheral groove incline surface 212. This leftward movement of the piston 205 in response to the sustained force disengages and moves at least a portion of the reduced peripheral end portion 213 of said piston through the seal 40 to connect the chamber 28 in by-pass relation with the housing recess 37 through the by-pass passage defined between the reduced end portion 213, the spacer member bore 203 and the housing recess 37 when said piston is in its leftward actuated position. In this manner, the established fluid pressure in the branch 102 is now transmitted from the master cylinder chamber 9 through the outlet port 15 and the conduit 107 and therefrom in by-pass or shunt relation with the proportioning valve 21 through the conduit 108, the flow port 34 of the control valve 201, the chamber 28, the spacer member cross-passages and bores 203, 204, the housing recess 37, the delivery or by-pass port 39 and conduit 111 to the wheel cylinder 23 to effect energization of the rear brakes 24. Therefore, upon failure of the fluid pressure in the branch 103, it is obvious that the established fluid pressure in the branch 102 is transmitted directly to the wheel cylinder 23 effecting full energization of the rear brakes, and also that the proportioning valve is by-passed or shunted to obviate the altering effect thereof on the magnitude of the established fluid pressure normally to the rear brakes 24.

The leftward movement of the piston 205 upon the failure of fluid pressure in the branch 103, as described above, moves the piston inclined surface 212 leftwardly toward a position driving the switch member 217 upwardly thereon against the compressive force of the spring 221 to engage the contact 220 with the interior end of the terminal 216. In this manner, the engagement of the contact 220 with the interior end of the terminal 216 completes the electrical circuit 66 to light the driver warning lamp 69 by effecting current flow from the battery 71 through the ignition switch 70, the lead 72, said lamp, the lead 68, terminal 216, the switch member 217 and switch housing 215 to the control valve housing 20 which is grounded at 67. When the branch 103 has been repaired so that fluid pressure can again be established therein, the established fluid pressure in the control valve chamber 27 acts on the effective area $A_1$ of the piston 205 creating a force for moving said piston in a rightward direction against the substantially equal and opposing force of the established fluid pressure in control valve chamber 28 acting on area $A_2$, and at the same time, the established fluid pressure in the chamber 28 is manually reduced to permit the rightward movement of said piston to its original or centered position, as shown in FIG. 5. Although the control valve 201 has been described functioning in the system 101, it is obvious, of course, from the foregoing that said control valve will also function in the system 1.

From the foregoing, it is now apparent that novel fluid pressure systems 1, 101 and control valves 19, 201 meeting the objects set out hereinbefore, as well as other objects, are provided and that changes or modifications as to the precise configurations, shapes, details and connections of the constructions set forth in the disclosure by way of illustration may be made by those skilled in the art without departing from the spirit of the invention.

The embodiments of the invention in which an exclusive property or privilege is claimed are defined as follows:

1. A control valve comprising a housing having a pair of pressure fluid flow passages therein, means movable in said housing between said flow passages and defining with said housing by-pass passage means for connection with one of said flow passages, said means being movable in response to a fluid pressure differential between the established fluid pressures in said flow passages in excess of a predetermined value toward a position connecting said by-pass passage means with said one flow passage.

2. A control valve comprising a housing having a pair of pressure fluid flow passages and by-pass passage means therein, switch actuating means movable in said housing between said pressure fluid flow passages and having opposed end portions respectively subjected to established fluid pressure in said flow passages, one of said end portions controlling pressure fluid communication between one of said flow passages and said by-pass passage means, said switch actuating means being responsive to the established fluid pressure in said one flow passage acting on said one opposed end and having a magnitude predeterminately greater than that of the established fluid pressure in the other of said flow passages acting on the other of said end portions to move said one end portion toward a position establishing pressure fluid communication between said one flow passage and said by-pass passage means.

3. A control valve comprising a housing, a pair of pressure fluid flow passages in said housing adapted to normally receive pressure fluid flows having established fluid pressures of substantially equal magnitudes, respectively, switch actuating means movable between operative and inoperative positions in said housing and between said flow passages, opposed areas on said switch actuating means respectively responsive to the established fluid pressures in said flow passages, said switch actuating means being normally in its inoperative position when the established fluid pressures in said flow passages acting on said opposed areas are substantially equal, said switch actuating means including means defining with said housing by-pass passage means for connection with one of said flow passages, said switch actuating means being movable toward its operative position in response to established fluid pressure in one of said one flow passages and the other of said flow passages acting on one of said areas and having a magnitude predeterminately greater than that of the established fluid pressure in the other of said one and other flow passages acting on the other of said areas to move said included means toward a position connecting said by-pass passage means with said one flow passage.

4. A control valve comprising a housing having first and second fluid pressure chambers therein, switch actuating means movable in said housing and defining therewith a third chamber between said first and second chambers, opposed areas on said switch actuating means respectively responsive to established fluid pressures in said first and second chambers, and said switch actuating means including means for controlling pressure fluid communication between said third chamber and one of said first and second chambers, said switch actuating means being responsive to established fluid pressure in said one of said first and second chambers acting on one of said opposed areas and having a magnitude predeterminately in excess of that of the established fluid pressure in the other of said first and second chambers acting on the other of said areas to move said included means toward a position establishing pressure fluid communication between said third chamber and said one of said first and second chambers.

5. A control valve comprising a housing having three ports therein, switch actuating means movable in said housing between two of said ports and controlling pressure fluid communication between the third port and one of said two ports, and opposed effective areas on said switch actuating means respectively responsive to established fluid pressures at said two ports, said switch actuating means being movable in response to fluid pressure at said one of said two ports acting on one of said opposed areas and having a magnitude predeterminately greater than that of the established fluid pressure at the other of said two ports acting on the other of said areas toward a position establishing pressure fluid communication between said third port and said one of said two ports.

6. A control valve comprising a housing having a pair of ports therein normally subjected to substantially equal fluid pressures, switch actuating means movable between a normally centered position and opposed translated positions in said housing between said ports, opposed areas on said switch actuating means respectively responsive to the established fluid pressures at said ports, said switch actuating means normally being in its centered position when the established fluid pressures at said ports acting on said opposed areas are substantially equal, a third port in said housing, and said switch actuating means including means for controlling pressure fluid communication between one of said pair of ports and said third port, said switch actuating means being responsive to established fluid pressure at said one of said pair of ports acting on one of said areas and having a magnitude predeterminately in excess of that of the established fluid pressure at the other of said pair of ports acting on the other of said areas to move said included means toward one of its opposed translated positions establishing pressure fluid communication between said third port and said one of said pair of ports.

7. The control valve according to claim 5, wherein said switch actuating means includes means defining with said housing valve means between said third port and said one of said two ports, said valve means normally being closed to interrupt pressure fluid communication between said third port and said one of said two ports when the established fluid pressures at said one and other of said two ports are substantially equal and said valve means being movable upon actuation of said switch actuating means toward an open position establishing pressure fluid communication between said third port and said one of said two ports.

8. The control valve according to claim 7, comprising a bore in said housing between said two ports, recess means in said bore connected with said third port, said switch actuating means including piston means slidable in said bore and extending through said recess means, opposed end portions on said piston means respectively defining said opposed areas, and said valve means including sealing means engaged between said bore and one opposed end portion of said piston means.

9. The control valve according to claim 8, wherein said sealing means is caried in said one opposed end portion of said piston means in sealing engagement with said bore, said sealing means being movable with said piston means into said recess and out of sealing engagement with said bore upon actuation of said piston means in response to the predeterminately greater established fluid pressure at said one of said two ports.

10. The control valve according to claim 8, wherein said sealing means is carried in said bore in sealing engagement with said one opposed end portion of said piston means, said one opposed end portion of said piston means including a reduced portion adjacent to said sealing means, said one opposed end portion of said piston means being movable out of sealing engagement with said sealing means and said reduced portion being movable beneath said sealing means to establish pressure fluid communication between said one of said two ports and said third ports upon actuation of said piston means in response to the predeterminately greater established fluid pressure at said one of said two ports.

11. The control valve according to claim 8, comprising second and third spaced seal means engaged between said bore and piston means and defining a chamber in said bore between said other of said two ports and said recess means, switch positioning means on said piston means in said chamber, other means within said housing defining a switch chamber connected with said first named chamber, switch means connected with said housing in said switch chamber including a follower contact extending into said first named chamber and movable between circuit making and breaking positions, and a switch positioning portion on said piston means in said first named chamber normally engaged with said follower contact to maintain said follower contact in its circuit braking position, said follower contact being movable toward its circuit making position when said switch positioning portion is disengaged therefrom upon actuation of said piston means in response to the predeterminately greater established fluid presure at eaid one of said two ports.

12. A control valve comprising a housing, and means movable in said housing for comparing the magnitudes of separate fluid pressures supplied thereto including means defining with said housing by-pass passage means for subjection to one of the supplied fluid pressures when the magnitude thereof exceeds that of the other of the supplied fluid pressures by a predetermined value.

13. A control valve comprising a housing having three ports therein, means movable in said housing between two of said ports for comparing the magnitudes of the established fluid pressures at said two ports, said means being movable toward one of said two ports in response to a predetermined differential between the established fluid pressures at said two ports, and said means including means for controlling pressure fluid communication between the other of said two ports and said third port, said included means being moved toward a position in said housing establishing pressure fluid communication between said other of said two ports and said third port upon the movement of said first named means toward said one of said two ports.

14. A control valve comprising a housing, means for comparing the magnitudes of separate fluid pressures supplied to said housing and movable from a normally centered position toward opposed translated positions in said housing in response to oppositely acting differentials in excess of a predetermined value between the magnitudes of the separately supplied fluid pressures acting thereon, and said means including other means defining with said housing passage means for subjection to one of the supplied fluid pressures upon movement of said first named means toward one of its opposed translated positions.

15. The control valve according to claim 14, wherein said other means includes valve means for controlling said passage means, said valve means being movable to a position in said passage means permitting the passage therethrough of the one supplied fluid pressure upon the movement of said first named means toward its one translated position.

16. The control valve according to claim 14, wherein said other means comprises an end portion on said first named means subjected to the one supplied fluid pressure, another end portion on said first named means opposed to said first named end portion and subjected to the other of said supplied fluid pressures, said first named end portion being movable with said first named means to its one translated position toward a position in said passage means permitting the passage therethrough of the one supplied fluid pressure when the differential between the magnitude of the one supplied fluid pressure acting on said first named end portion exceeds that of the other supplied fluid pressure acting on said other end portion by the predetermined value.

17. The control valve according to claim 16, comprising a pair of opposed and substantially equal effective areas on said first named and other end portions subjected to the one and other supplied fluid pressures, respectively.

18. The control valve according to claim 16, comprising valve means on said one end portion normally isolating said passage means from the one supplied fluid pressure and movable toward a position in said passage means permitting the passage therethrough of the one supplied fluid pressure upon the movement of said first named means toward its one translated position.

19. The control valve according to claim 18, comprising a bore in said housing, said bore defining a portion of said passage means, said first named means including piston means slidable in said bore, said one and other end portions being on said piston means, recess means in said bore and spaced between said one and other end portions, said valve means being normally engaged with said bore to isolate said passage means from the one supplied fluid presure and being movable into said recess means and out of sealing engagement with said bore to its position permitting the passage through said passage means of the one supplied fluid pressure upon the movement of said piston means toward its one translated position.

20. The control valve according to claim 19, wherein said valve means includes sealing means on said one end portion and normally in sealing engagement with said bore, said sealing means being movable with said one end portion into said recess means and out of engagement with said bore upon the movement of said piston means toward its one translated position.

21. The control valve according to claim 14, comprising sealing means disposed in said housing, said other means including an end portion movable through said sealing means and normally engaged therewith to isolate said passage means from the one supplied fluid pressure, and a reduced portion on said end portion, said end portion being disengaged from said sealing means and said reduced portion being movable beneath said sealing means to connect said passage means in pressure fluid communication with the one supplied fluid pressure upon the movement of said first named means toward its one translated position.

22. The control valve according to claim 21, comprising a bore in said housing, said sealing means being disposed in said bore, said first named means including piston means slidable in said bore, said end portion and reduced portion being on said piston means.

23. The control valve according to claim 22, comprising another end portion on said piston means opposed to said first named end portion and subjected to the other of the supplied fluid pressures, said first named end portion and said reduced portion being movable with said piston means toward its one translated position to connect said passage means in pressure fluid communication with the one supplied fluid pressure when the differential between the magnitude of the one supplied fluid pressure acting on said first named end portion exceeds that of the other supplied fluid pressure acting on said other end portion by the predetermined value.

References Cited

UNITED STATES PATENTS 2,239,348   4/1941   Wirtanen et al. _____ 200—82.3

ROBERT K. SCHAEFER, *Primary Examiner.*

H. BURKS, *Assistant Examiner.*

U.S. Cl. X.R.

137—87; 188—151, 152; 303—6, 84